No. 751,124. PATENTED FEB. 2, 1904.
A. H. WELLS.
COMBINED PLANTER AND FERTILIZER DISTRIBUTER.
APPLICATION FILED JUNE 15, 1903.
NO MODEL. 2 SHEETS—SHEET 1.
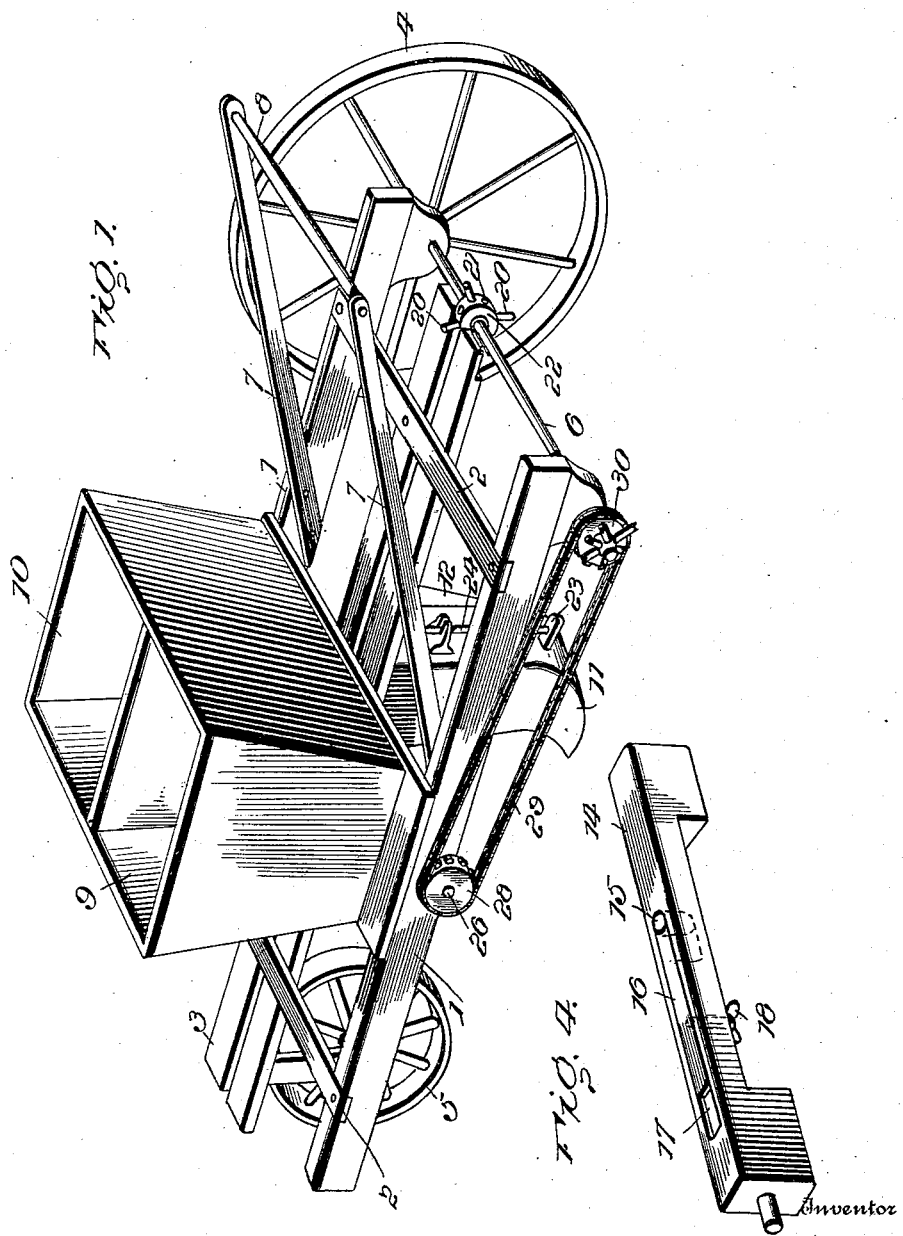

No. 751,124. PATENTED FEB. 2, 1904.
A. H. WELLS.
COMBINED PLANTER AND FERTILIZER DISTRIBUTER.
APPLICATION FILED JUNE 15, 1903.
NO MODEL. 2 SHEETS—SHEET 2.
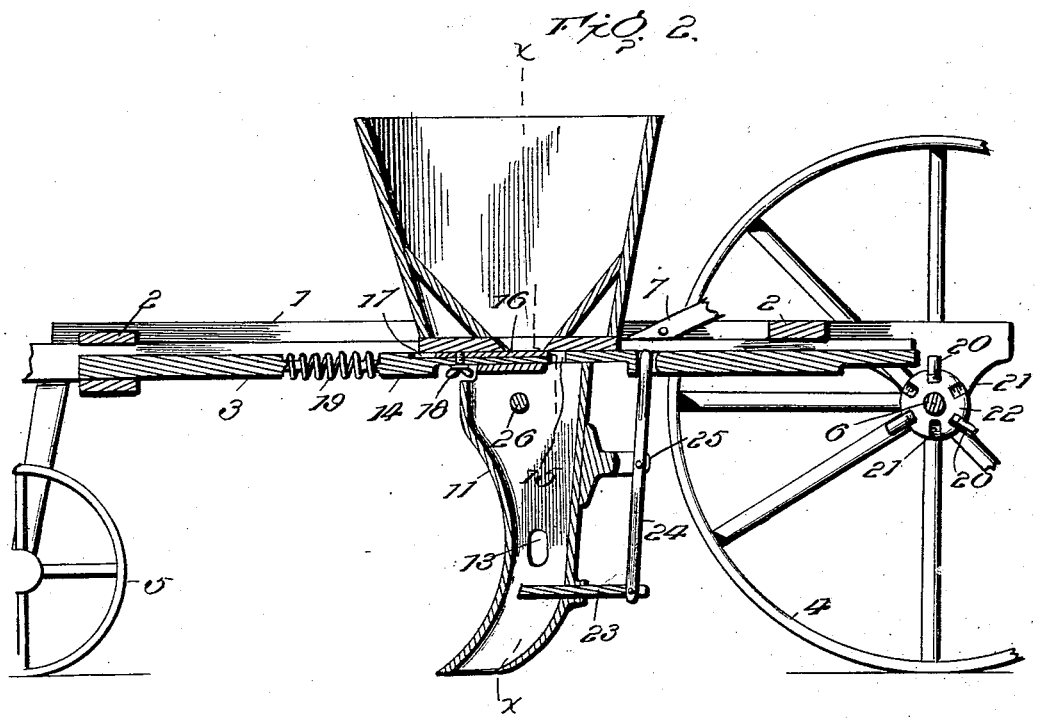
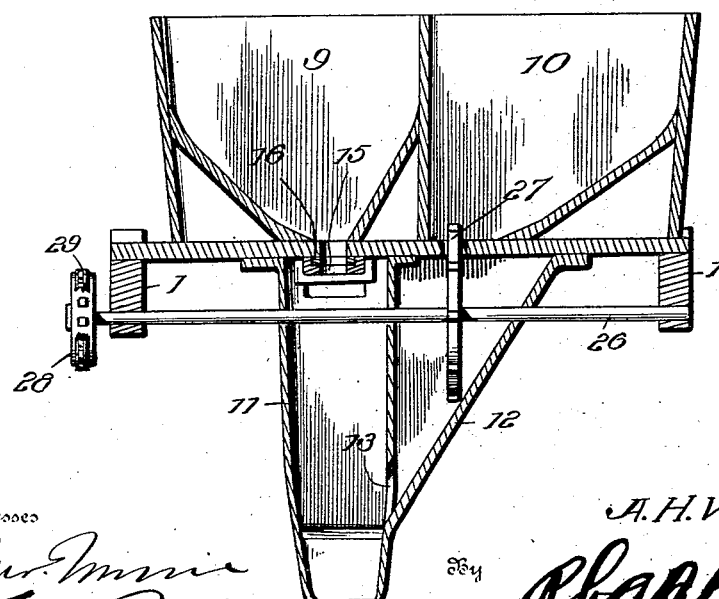
Witnesses
Inventor
A. H. Wells
Attorneys No. 751,124. Patented February 2, 1904.

UNITED STATES PATENT OFFICE.

ALBERT H. WELLS, OF SPRINGBORO, PENNSYLVANIA.

COMBINED PLANTER AND FERTILIZER-DISTRIBUTER.

SPECIFICATION forming part of Letters Patent No. 751,124, dated February 2, 1904.

Application filed June 15, 1903. Serial No. 161,575. (No model.)

*To all whom it may concern:*

Be it known that I, ALBERT H. WELLS, a citizen of the United States, residing at Springboro, in the county of Crawford and State of Pennsylvania, have invented certain new and useful Improvements in a Combined Planter and Fertilizer-Distributer, of which the following is a specification.

This invention has relation to the type of agricultural implements designed for sowing seed and at the same time distributing fertilizer, the two being deposited in one hill, trench, or furrow.

An essential feature of the invention is the combination of the seed and fertilizer boxes and distributing mechanisms, so that the parts are compactly arranged and are adapted to be operated by simple actuating mechanism deriving power from one or both ground-wheels.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a combined planter and fertilizer-distributer constructed in accordance with and embodying the essential features of the invention. Fig. 2 is a central longitudinal section thereof. Fig. 3 is a transverse section on the line X X of Fig. 2. Fig. 4 is a perspective view of the reciprocating bar for operating the seed-dropping mechanism.

Corresponding and like parts are referred to in the following description and indicated in all the views of the drawings by the same reference characters.

The framework may be of any construction and adaptation for supporting the working parts and, as shown, comprises longitudinal bars 1, cross-bars 2, and an intermediate longitudinal bar 3, said frame being supported upon ground-wheels 4 and 5, the ground-wheels 4 being connected to axle 6 for rotation therewith. Handle-bars 7 project upward and rearward from the frame and are secured at their lower ends to bars 1 and are connected at their upper rear ends by crosspiece 8, constituting the handle proper.

Hoppers 9 and 10 are mounted upon the frame of the machine intermediate of its ends and may constitute individual boxes or parts of a single box subdivided to form compartments which constitute the hoppers. The hopper 9 is adapted to receive the seed, and the hopper 10 the fertilizer. The grain from hopper 9 is directed to the ground by boot or spout 11, which is provided at its lower end with an opener in the usual manner to provide a furrow or trench into which the grain and fertilizer are deposited. A chute 12 communicates at its lower end with spout or boot 11 at 13 and is adapted to direct the fertilizer from hopper 10 into grain-spout 11. Boot or grain-spout 11 and chute 12 communicate at their upper ends with, respectively, hoppers 9 and 10. Slide-bar 14 is mounted upon longitudinal bar 3 so as to reciprocate and operates below hopper 9 and is provided with opening 15, by means of which the grain or seed is discharged from hopper 9 in regulable quantity. Opening 15 is adapted to be varied so as to permit more or less grain or seed to be deposited at a single operation, and for this purpose cut-off 16 is fitted in recess 17 in the top side of bar 14 and held in place by clamp-screw 18. Spring 19 is interposed between slide-bar 14 and a part of longitudinal bar 3 and normally exerts a pressure on said bar 14 to hold it at the limit of its rearward movement. Slide-bar 14 is moved forward against the tension of spring 19 by one or more tappets 20, fitted in openings 21 of tappet-wheel 22, secured to axle 6 for rotation therewith. A series of openings 21 are formed around the periphery of tappet-wheel 22, thereby admitting of changing the relation of tappets 20 so as to operate slide-bar 14 any given number of times during a complete revolution of the ground-wheels 4 and tappet-wheel 22. This construction admits of depositing the seed any required distance apart.

Valve 23 operates through an opening in the rear side of grain-spout or boot 11 and is located below opening 13 and is adapted to be actuated by means of lever 24, pivoted to bracket 25, and having its upper end in engagement with slide-bar 14 by passing through an opening thereof. When slide-bar 14 is pressed forward by engagement of tappet 20 therewith, opening 15 is brought into position to receive grain from hopper 9 and the upper end of lever 24 is carried forward and valve 23 moved rearward, so as to permit the discharge of grain and fertilizer previously received thereon. As the tappet clears slide-bar the latter is moved rearward by the tension of spring 19, thereby closing valve 23 and permitting grain and fertilizer to drop thereon and to be held until slide-bar is again actuated. The fertilizer may be distributed by mechanism commonly employed for this purpose, and, as shown, shaft 26 is arranged transversely of the machine and is mounted in bearings applied to longitudinal-bars 1 and is provided with distributing-wheels 27, adapted to operate through an opening in the bottom of hopper 10, so as to effect positive feed and discharge of the fertilizer therefrom. A sprocket-wheel 28 is applied to the outer end of shaft 26 and is connected by sprocket-chain 29 with a companion sprocket-wheel 30, secured to axle 6 or ground-wheel 4 on the same side of the machine with parts 28 and 29. As the machine is drawn over the field rotary motion is imparted to axle 6 by contact of wheels 4 with the ground and the mechanisms for effecting discharge of the grain and fertilizer are actuated in the manner stated.

Having thus described the invention, what is claimed as new is—

1. In a combined planter and fertilizer-distributer, the combination of subjacent hoppers, a grain-spout in communication with the seed-hopper, a chute in communication with the hopper containing the fertilizer and opening at its lower end into the grain-spout, a valve operating in the lower portion of the grain-spout below the point of communication therewith of the fertilizer-chute, and means for controlling the delivery of the grain and fertilizer from the respective hoppers, and actuating means for said valve, substantially as set forth.

2. In a combined planter and fertilizer-distributer, the combination of subjacent hoppers, a grain-spout in communication with the seed-hopper, a chute in communication with the hopper containing the fertilizer and opening at its lower end into the grain-spout, a valve operating in the lower portion of the grain-spout below the point of communication therewith of the fertilizer-chute, means for controlling the delivery of the grain and fertilizer from the respective hoppers, actuating means for said valve, a transversely-arranged shaft, a distributing-wheel secured to said shaft and operating in the fertilizer-hopper, a slide-bar arranged to reciprocate beneath the seed-hopper, an axle provided with ground wheels, and means for transmitting motion from said axle to the slide-bar and shaft provided with the distributing-wheel, substantially as described.

3. A combined planter and fertilizer-distributer comprising subjacent hoppers adapted to receive the seed and fertilizer, a grain-spout in communication with the seed-hopper, a chute establishing communication between the fertilizer-hopper and the lower portion of the grain-spout, means for effecting a discharge of the fertilizer into the chute, a slide-bar having an opening, a cut-off for regulating the size of said opening, a spring for moving the slide-bar in one direction, a tappet-wheel and tappets for moving the slide-bar against the tension of said spring, a valve arranged to operate in the lower portion of the grain-spout below the point of communication therewith of the fertilizer-chute, and a lever connecting said valve with the slide-bar, substantially as specified.

In testimony whereof I affix my signature in presence of two witnesses.

ALBERT H. WELLS. [L. S.]

Witnesses:
R. H. STURTEVANT,
WILL. B. POWELL.